United States Patent [19]
Jung

[11] Patent Number: 5,845,012
[45] Date of Patent: Dec. 1, 1998

[54] APPARATUS FOR ENCODING AN IMAGE SIGNAL HAVING A STILL OBJECT

[75] Inventor: Hae-Mook Jung, Seoul, Rep. of Korea

[73] Assignee: Daewoo Electronics Co., Ltd., Seoul, Rep. of Korea

[21] Appl. No.: 505,982

[22] Filed: Jul. 24, 1995

[30] Foreign Application Priority Data

Mar. 20, 1995 [KR] Rep. of Korea .................... 1995-5860

[51] Int. Cl.⁶ ..................................................... G06K 9/48
[52] U.S. Cl. .......................... 382/242; 382/232; 348/397; 348/410
[58] Field of Search ................................... 382/242, 251, 382/254; 348/416, 405, 699, 397, 390, 413, 394, 396; 358/426

[56] References Cited

U.S. PATENT DOCUMENTS

| | | | |
|---|---|---|---|
| 4,951,140 | 8/1990 | Ueno ........................................ | 348/413 |
| 5,491,514 | 2/1996 | Fukuda et al. ........................... | 348/397 |
| 5,491,761 | 2/1996 | Kim ......................................... | 382/251 |
| 5,612,744 | 3/1997 | Lee et al. ................................. | 348/416 |

OTHER PUBLICATIONS

Chen et al., "Scene Adaptive Coder", Mar. 1984, IEEE Transactions on Communications, vol. Com. 32, No. 3, pp. 225–232.

Hötter, "Object–oriented Analysis–Synthesis Coding Based on Moving Two–Dimensional Objects", 1990, Signal Processing: Image Communication 2, pp. 409–428.

*Primary Examiner*—Jose L. Couso
*Assistant Examiner*—Anh Hong Do
*Attorney, Agent, or Firm*—Anderson, Kill & Olick, P.C.

[57] ABSTRACT

An apparatus, capable of improving the overall coding efficiency by encoding an image signal having a still object based on an improved object oriented coding technique, comprises a first detector for detecting a contour image signal placed at the boundary of the object within the image signal and for encoding the detected contour image signal, to thereby generate a first encoded image signal; a divider for dividing the image signal into a plurality of image blocks with a predetermined identical size; a second detector for detecting image blocks containing the contour image signal from the image blocks and for generating a reconstructed image block for each of the detected image blocks; an encoder, responsive to a selection signal corresponding to the type of the image blocks, for selectively encoding the reconstructed image blocks or the non-detected image blocks, to thereby produce a second encoded image signal; and a formatter for formatting the first and the second encoded image signals.

4 Claims, 3 Drawing Sheets

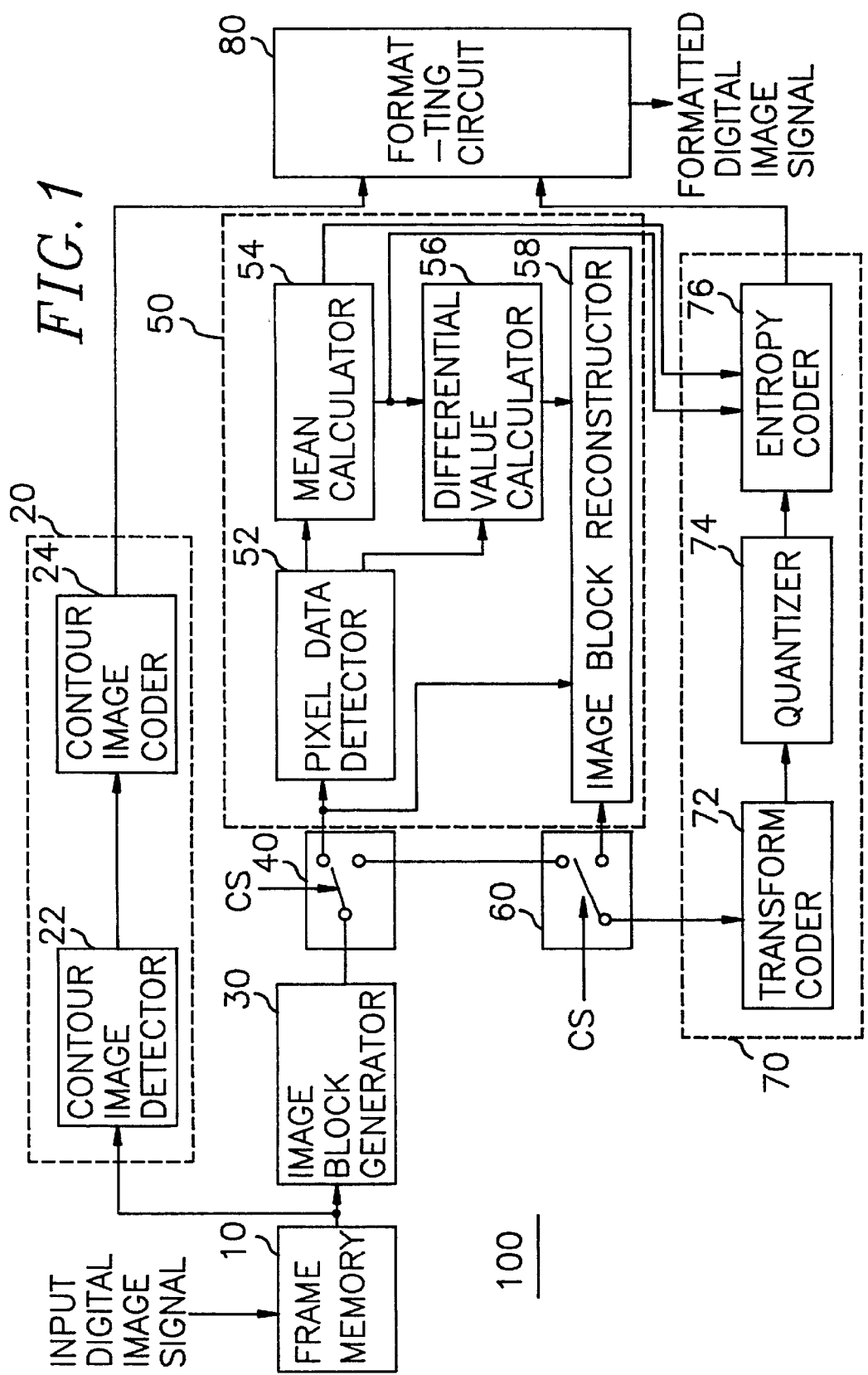

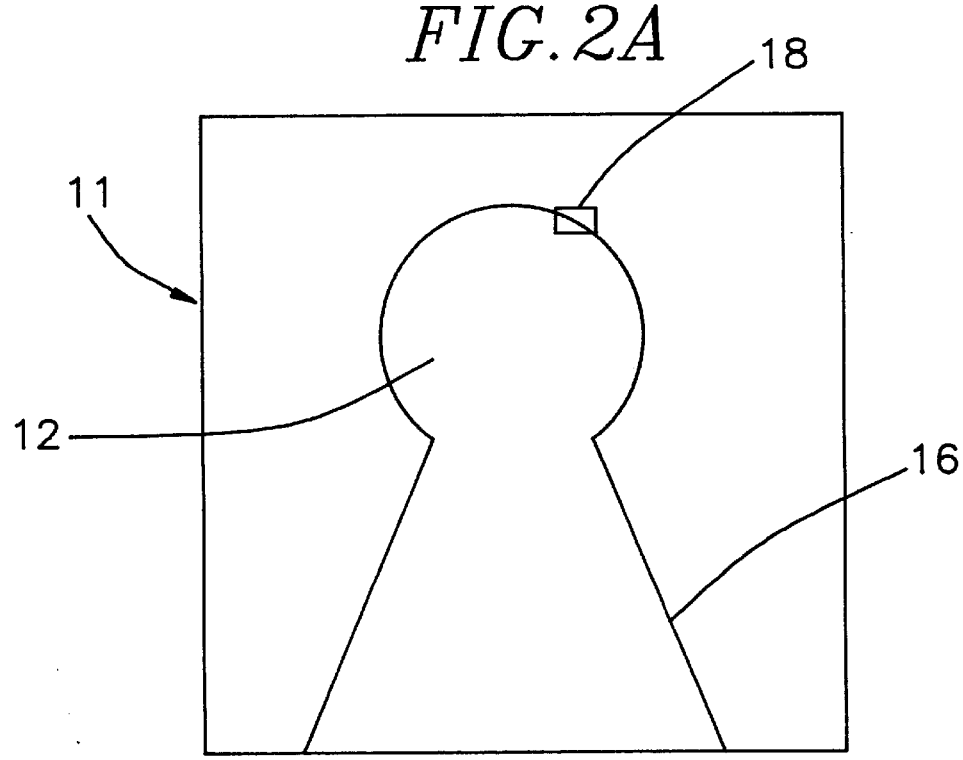

APPARATUS FOR ENCODING AN IMAGE SIGNAL HAVING A STILL OBJECT

FIELD OF THE INVENTION

The present invention relates to an apparatus for encoding an image signal at a low bit-rate; and, more particularly, to an apparatus for effectively encoding an image signal having a still object using an improved object-oriented coding technique, to thereby improve the overall coding efficiency.

DESCRIPTION OF THE PRIOR ART

In a digitally televised system such as video-telephone, high definition television or teleconference system, a large amount of digital data is needed to define each image frame signal since each line in the image frame signal comprises a sequence of digital data referred to as "pixels". Since, however, the available frequency bandwidth of a conventional transmission channel is limited, in order to transmit the substantial amount of digital data therethrough, it is inevitable to compress or reduce the volume of data through the use of various data compression techniques especially in such low bit-rate image signal encoding systems as video-telephone and teleconference systems.

One of such methods for encoding image signals for a low bit-rate encoding system is the so-called object-oriented analysis-synthesis coding technique (see Michael Hotter, "Object-Oriented Analysis-Synthesis Coding Based on Moving Two-Dimensional Objects", *Signal Processing: Image Communication*, 2, 409–428 (1990)).

According to the object-oriented analysis-synthesis coding technique, an input image signal, which has moving objects, is divided according to the objects; and three sets of parameters for defining motion, contour and pixel data of each object are processed through different encoding channels.

In case of processing image data or pixels lying within a "still object", a transform coding technique for reducing only the spatial redundancies contained in the image data is mainly employed in the object-oriented analysis-synthesis coding technique. One of the most frequently used transform coding techniques for image data compression is a DCT (discrete cosine transform) based block transformation coding, which converts a block of digital image data, for example, a block of 8×8 pixels, into a set of transform coefficient data. This method is described in, e.g., Chen and Pratt, "Scene Adaptive Coder", *IEEE Transactions on Communications*, COM-32, No. 3, pp. 225–232 (March 1984).

In the DCT based block transformation coding, pixels outside of the still object are normally padded or masked with zero values. Since, however, the zero-masked pixels are coded together with the pixels with particular values within the object, there may appear high frequency components therebetween during the coding process, thereby lowering the overall coding efficiency.

SUMMARY OF THE INVENTION

It is, therefore, a primary object of the present invention to provide an apparatus for effectively encoding an image signal having a still object using an improved object-oriented coding technique, thereby improving the overall coding efficiency.

In accordance with the invention, there is provided an apparatus for encoding an image signal having a still object, wherein non-zero values are assigned to the pixels within the still object and zero values are assigned to the pixels outside thereof, which comprises:

means for detecting a contour image signal placed at the boundary of the still object within the image signal and for encoding the detected contour image signal, to thereby generate a first encoded image signal;

means for dividing the image signal into a plurality of image blocks having a predetermined identical size;

means for detecting image blocks containing the contour image signal from the image blocks and for generating a reconstructed image block for each of the detected image blocks;

means, responsive to a selection signal corresponding to the type of the image blocks, for selectively encoding the reconstructed image blocks or the non-detected image blocks, to thereby produce a second encoded image signal; and means for formatting the first and the second encoded image signals.

BRIEF DESCRIPTION OF THE DRAWINGS

The above and other objects and features of the present invention will become apparent from the following description of preferred embodiments taken in conjunction with the accompanying drawings, in which:

FIG. 1 shows a block diagram of an image signal encoding apparatus of the present invention; and FIGS. 2A, 2B and 2C present diagrams illustrating the procedure for producing reconstructed image blocks adapted for encoding in accordance with the present invention.

DETAILED DESCRIPTION OF THE PREFERRED EMBODIMENTS

Figure 2C:
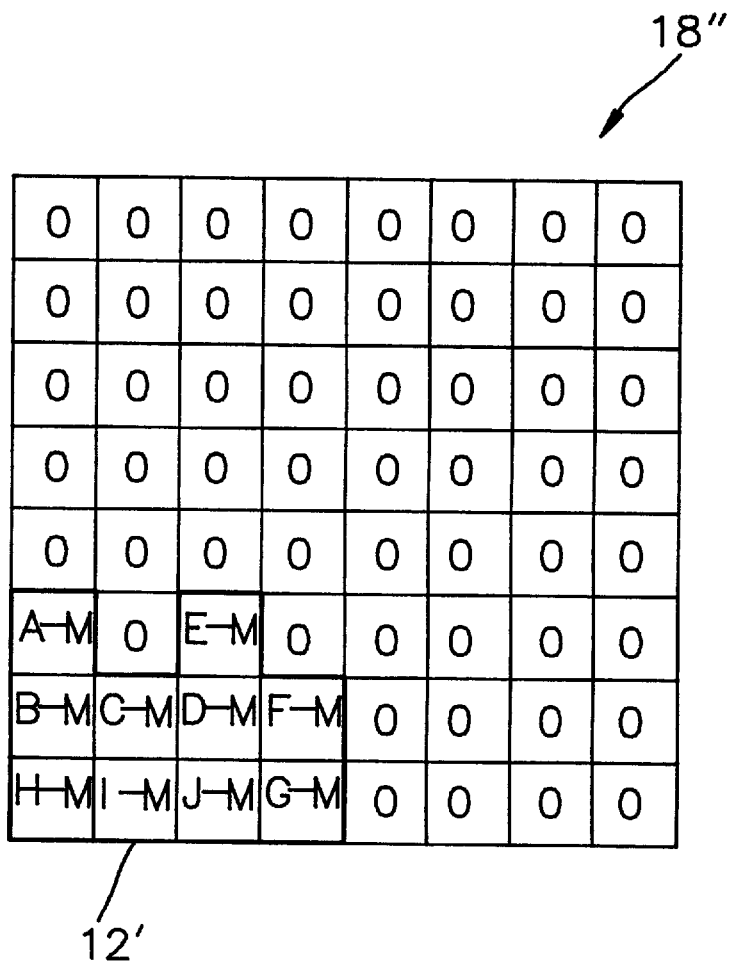

Referring to FIG. 1, there is shown a detailed block diagram of the novel image signal encoding apparatus 100 of the present invention. The image signal encoding apparatus 100 comprises a frame memory 10, first and second image signal encoders 20 and 70, an image block generator 30, an image block reconstruction device 50 and a formatting circuit 80.

An input digital image signal having a still object is inputted to the frame memory 10 for the storage thereof and the stored image signal is then retrieved to a contour image detector 22 of the first image signal encoder 20 and the image block generator 30. The input digital image signal includes non-zero values assigned to those pixels within the object and zero values for the pixels outside thereof.

The first image signal encoder 20, which includes the contour image detector 22 and a contour image coder 24, serves to detect and encode a contour image signal of the object in the image signal from the frame memory 10 by employing a known contour image detecting and coding technique to produce an encoded contour image signal. More specifically, as illustrated in FIG. 2A, the contour image detector 22 detects a contour image signal 16 of an object 12 in an input image signal 11 through the use of a conventional contour or edge detection algorithm, e.g., a sobel operator. As well known in the art, the contour image signal of the object can be derived from edge points defined as pixel locations at which a significant change occurs on a physical aspect of the image signal to form the object thereof. Such a change can be detected by comparing a pixel value obtained from the values or grey levels of a pixel to be detected and its neighboring M×M, e.g., 3×3, pixels with a predetermined threshold value wherein the pixel to be detected is placed at the center of the M×M pixels. The contour image signal detected at the contour image detector 22 is then provided to the contour image coder 24 for the encoding thereof.

At the contour image coder 24, the contour image signal from the contour image detector 22 is encoded by using, e.g., a binary arithmetic code of JPEG(Joint Photographic Experts Group) and then the encoded contour image signal is supplied to the formatting circuit 80.

In the meantime, the image block generator 30 divides the image signal from the frame memory 10 into a multiplicity of image blocks of, e.g., 8×8, pixels and provides the divided image blocks to a first switching circuit 40 on a block-by-block basis. At the first switching circuit 40, each of the image blocks from the image block generator 30 is selectively coupled to the image block reconstruction device 50 or a second switching circuit 60 in response to a selection signal CS, indicating whether or not an edge or contour image signal exists in the image block, from a system controller(not shown). In other words, in response to the logic high selection signal CS, each image block is coupled to the image block reconstruction device 50; and, in response to the logic low selection signal CS, it is sent to the second switching circuit 60.

As shown in FIG. 1, the image block reconstruction device 50 of the present invention includes a pixel data detector 52, a mean calculator 54, a differential value calculator 56 and an image block reconstructor 58. The image block reconstruction device 50 converts each of the image blocks from the first switching circuit 40 into a reconstructed image block adapted for transform coding by using the novel object-oriented coding scheme of the invention.

In the inventive object-oriented coding scheme, the pixel data detector 52 serves to detect a set of pixels placed at the boundary of an object in each of the image blocks from the first switching circuit 40 by using a known boundary pixel detection algorithm, for example, the sobel operator mentioned above. Specifically, assuming, as illustrated in FIGS. 2A and 2B, that an image block 18 to be processed is identical to a square block 18' having, e.g., 8×8 pixels and the square block 18' includes, e.g., 10, i.e., A to J, pixels within an object region 12' thereof, and pixels lying outside of the object region 12' are padded with zero values, then there are 5, i.e., A, C, E, F and G, pixels which can be detected as be of the boundary pixels of the image block 18'. After detecting the boundary pixels of each image block, all of the pixels, e.g., A to J pixels, within the object region 12' are chosen. Subsequently, the detected boundary pixels of each image block are provided to the mean calculator 54 while all of the chosen pixels are fed to the image block reconstructor 58.

At the mean calculator 54, a mean pixel value for the boundary pixels of each of the image blocks from the pixel data detector 52, Bmean, is calculated by employing a mean calculation algorithm well known in the art; and information representing the position of the image block is derived. The mean pixel value Bmean and the information, for each of the image blocks, calculated and derived at the mean calculator 54 are then provided to the differential value calculator 56 and the second image signal encoder 70, respectively.

At the differential value calculator 56, each of the pixels from the pixel data detector 52 and the mean pixel value Bmean from the mean calculator 54 are processed to calculate a differential pixel value representing the differences between each of the pixel values and the mean pixel value Bmean. Such differential pixel values are applied to the image block reconstructor 58 which is adapted to convert each of the image blocks, e.g., 18' shown in FIG. 2B, from the first switching circuit 40 into a reconstructed image block, e.g., 18" shown in FIG. 2C, through the use of the calculated differential pixel values. As can be seen from FIGS. 2B and 2C, each of the original pixel values in the object region 12' is replaced with the corresponding differential pixel value, whereas the zero pixel values lying outside thereof are never converted into non-zero values. Each of the image blocks reconstructed by the image block reconstructor 58 is coupled to the second switching circuit 60.

In response to the selection signal CS from the system controller, the second switching circuit 60 selectively couples the non-reconstructed image blocks from the first switching circuit 40 or the reconstructed image blocks from the image block reconstructor 58 to the second image signal encoder 70.

The second image signal encoder 70, which includes a transform coder(TC) (72), a quantizer 74 and an entropy coder 76, serves to encode the image data included in each of the reconstructed or non-reconstructed image blocks from the second switching circuit 60 by using a conventional transform and stastical coding technique. That is to say, the TC (72) transforms the image data of each image block in the spatial domain from the second switching circuit 60 into a set of transform coefficients in the frequency domain by employing, e.g., a discrete cosine transform(DCT) and provides the set of transform coefficients to the quantizer 74. At the quantizer 74, the set of transform coefficients is quantized by using a known quantization method; and then the set of quantized transform coefficients is fed to the entropy coder 76 for further compressing.

The entropy coder 76 encodes either the set of quantized transform coefficients from the quantizer 74 for each of the non-reconstructed image blocks, or the set of quantized transform coefficients, the mean pixel value and the position information from the quantizer 74 and the mean calculator 54 for each of the reconstructed image blocks by using, e.g., a combination of run-length and variable length coding to generate an encoded image signal. The image signal encoded by the entropy coder 76 is then provided to the formatting circuit 80.

The formatting circuit 80 formats the encoded contour image signal from the contour image coder 24 and the encoded image signal from the entropy coder 76, to thereby provide a formatted digital image signal to a transmitter(not shown) for the transmission thereof. As shown above, therefore, the present invention is capable of considerably reducing high frequency components present between the pixels within a still object and those pixels outside thereof during the coding process using the concept of a reconstructed image block, thereby improving the overall coding efficiency.

While the present invention has been shown and described with respect to the preferred embodiments, it will be apparent to those skilled in the art that many changes and modifications may be made without departing from the spirit and scope of the invention as defined in the appended claims.

What is claimed is:

1. An apparatus for encoding an image signal having a still object, wherein the image signal includes non-zero values assigned for pixels within the still object and zero values assigned for pixels outside thereof, which comprises:

means for detecting a contour image signal placed at the boundary of the still object within the image signal and for encoding the detected contour image signal, to thereby generate a first encoded image signal;

means for dividing the image signal into a plurality of image blocks with a predetermined identical size;

means for detecting image blocks containing the contour image signal from the image blocks and for generating a reconstructed image block for each of the detected image blocks, wherein the reconstructed image block is obtained by replacing the original pixel values within the still object of said each detected image block with their respective corresponding differential pixel values between a mean pixel value of pixels located along the boundary of the still object and the original pixel values;

means for selectively encoding the reconstructed image blocks or the non-detected image blocks according to a block type of the image blocks, to thereby produce a second encoded image signal; and means for formatting the first and the second encoded image signals.

2. The apparatus as recited in claim 1, wherein said means for generating the reconstructed image blocks includes:

means for detecting, for each of the image blocks, a set of pixels present at the boundary of the object thereof;

means for calculating and generating a mean pixel value for the set of pixels of said each image block, and for producing information representing the position of said each image block;

means for detecting pixels within the object of said each image block and for calculating the differential pixel value representing the difference between the mean pixel value and each of the detected pixel values; and means for generating the reconstructed image block based on each of the detected image blocks and the differential pixel values thereof.

3. An apparatus for encoding an image signal having a still object, wherein the image signal includes non-zero values assigned for pixels within the still object and zero values assigned for pixels outside thereof, which comprises:

means for detecting a contour image signal located along the boundary of the still object within the image signal and encoding the detected contour image signal, to thereby generate a first encoded image signal;

means for dividing the image signal into a plurality of image blocks of a predetermined identical size;

generating means for detecting image blocks containing the contour image signal from the image blocks and generating a reconstructed image block for each of the detected image blocks, wherein the generating means includes:

means for detecting, for each of the image blocks, a set of pixels located along the boundary of the object thereof;

means for calculating and generating a mean pixel value for the set of pixels of said each image block and producing information representing the position of said each image block;

means for detecting pixels within the object of said each image block and calculating the differential pixel values representing the differences between the mean pixel value and each of the detected pixel values; and means for generating the reconstructed image block based on the differential pixel values;

means for selectively encoding the reconstructed image blocks or the non-detected image blocks according to a block type of the image blocks, to thereby produce a second encoded image signal; and means for formatting the first and the second encoded image signals.

4. The apparatus as recited in claim 3, wherein the reconstructed image block is obtained by replacing the original pixel values within the still object of said each detected image block with their respective corresponding differential pixel values.

* * * * *

UNITED STATES PATENT AND TRADEMARK OFFICE

CERTIFICATE OF CORRECTION

PATENT NO.    : 5,845,012

DATED         : December 1, 1998

INVENTOR(S)   : Hae-Mook Jung

It is certified that error appears in the above-identified patent and that said Letters Patent is hereby corrected as shown below:

On the title page: Item

[30] Foreign Application Priority Data

Mar. 20, 1995  [KR]  Rep. of Korea     95-5860

Signed and Sealed this

Second Day of March, 1999

Attest:

Q. TODD DICKINSON

*Attesting Officer*   Acting Commissioner of Patents and Trademarks